United States Patent
Budampati et al.

(10) Patent No.: US 10,018,487 B2
(45) Date of Patent: Jul. 10, 2018

(54) METHODS AND SYSTEMS FOR ACTIVATING SEALED SENSORS IN THE FIELD

(75) Inventors: Ramakrishna Budampati, Maple Grove, MN (US); Jeff Becker, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 804 days.

(21) Appl. No.: 13/161,364

(22) Filed: Jun. 15, 2011

(65) Prior Publication Data

US 2012/0319482 A1 Dec. 20, 2012

(51) Int. Cl.
*H02J 3/32* (2006.01)
*H02J 7/34* (2006.01)
(Continued)

(52) U.S. Cl.
CPC ............ *G01D 21/00* (2013.01); *G08C 19/00* (2013.01); *G08C 19/12* (2013.01); *H02J 13/00* (2013.01);
(Continued)

(58) Field of Classification Search
CPC ....... H03H 7/40; B60L 11/182; B60L 11/184; H02J 7/0063; H02J 13/00; H02J 17/00;
(Continued)

(56) References Cited

U.S. PATENT DOCUMENTS 5,483,826 A 1/1996 Schultz et al.
5,908,365 A * 6/1999 LaJaunie ............ E21B 43/11852
102/206
(Continued)

FOREIGN PATENT DOCUMENTS

CA 2778542 A1 12/2012
CN 101059354 A 10/2007
(Continued)

OTHER PUBLICATIONS

Hall et al., "Turn-onCircuits Based on Standard CMOS Technology for Active RFID Labels," Power Point Slides, School of Electrical & Electronic Engineering, Univ. of Adelaide, SA, Australia, 9 pages, prior to May 11, 2009.
(Continued)

*Primary Examiner* — Fritz M Fleming
*Assistant Examiner* — Jagdeep Dhillon
(74) *Attorney, Agent, or Firm* — Seager Tufte & Wickhem LLP

(57) ABSTRACT

The present disclosure provides methods and systems for initiating sealed sensor units in the field. A packaged sensor unit may include a sensor module, an activation mechanism and an internal battery, all situated in a sealed enclosure. In some cases, the sealed enclosure may be devoid of any externally accessible switches. A pre-defined triggering stimulus may be applied to the packaged sensor unit, and the pre-defined triggering stimulus may be detected via the activation mechanism. In response to the activation mechanism detecting the pre-defined triggering stimulus, the internal battery may be connected to the sensor module. Prior to detecting the pre-defined triggering stimulus, both the sensor module and the activation mechanism may draw no power from the internal battery of the packaged sensor unit. In some cases, the activation mechanism, once activated, irreversibly couples the power supply to the sensor module.

18 Claims, 4 Drawing Sheets

(51) Int. Cl.
*G01D 21/00* (2006.01)
*G08C 19/00* (2006.01)
*H02J 13/00* (2006.01)
*G08C 19/12* (2006.01)
*H01H 1/66* (2006.01)
*G06K 7/00* (2006.01)

(52) U.S. Cl.
CPC ............... *G06K 7/00* (2013.01); *H01H 1/66* (2013.01); *Y10T 307/527* (2015.04); *Y10T 307/766* (2015.04)

(58) Field of Classification Search
CPC ....... H02J 7/00; A61N 1/36032; A61N 1/378; G01N 19/00; G05B 23/02; H04L 9/32; B60R 25/04; H01H 47/00; H01H 1/66; F41A 17/06; G08B 13/22; G06K 7/00; F42B 8/00
USPC ............ 307/48, 104, 39, 43; 463/39, 40, 42; 604/153, 28, 29; 340/825.52; 361/802, 361/807; 362/276, 802, 807; 73/865.9
See application file for complete search history.

(56) References Cited

U.S. PATENT DOCUMENTS

| | | | |
|---|---|---|---|
| 6,298,787 B1* | 10/2001 | Warnagiris | F41H 13/00 102/498 |
| 6,351,906 B1* | 3/2002 | Honig et al. | 42/70.11 |
| 7,117,129 B1 | 10/2006 | Bash et al. | |
| 7,551,087 B2 | 6/2009 | McAllister | |
| 7,629,545 B1* | 12/2009 | Asner | H01H 35/14 200/61.45 R |
| 7,650,135 B2 | 1/2010 | Twitchell | |
| 7,675,935 B2 | 3/2010 | Samudrala et al. | |
| 8,237,542 B2* | 8/2012 | Katagiri | 340/5.6 |
| 2003/0193427 A1* | 10/2003 | Schroeder | G07C 9/00182 341/176 |
| 2005/0173900 A1* | 8/2005 | Zhao | B60R 21/23138 280/730.2 |
| 2005/0246040 A1* | 11/2005 | Horkavi | G05B 19/0426 700/83 |
| 2006/0114086 A1* | 6/2006 | Grigorov | 335/151 |
| 2008/0056429 A1* | 3/2008 | Tsubata | G01C 22/006 377/24.2 |
| 2008/0282817 A1* | 11/2008 | Breed | 73/865.9 |
| 2009/0098960 A1* | 4/2009 | Brywig | F42B 6/06 473/578 |
| 2009/0108814 A1* | 4/2009 | Wilkins | H02J 7/1423 320/162 |
| 2009/0121550 A1* | 5/2009 | Riviera | H02J 7/0068 307/66 |
| 2009/0146808 A1 | 6/2009 | Hoyden | |
| 2010/0013639 A1* | 1/2010 | Revert | G01S 5/0294 340/572.1 |
| 2010/0100327 A1 | 4/2010 | Jensen | |
| 2010/0121504 A1 | 5/2010 | Jones et al. | |
| 2010/0164742 A1* | 7/2010 | Anderson | 340/825.52 |
| 2010/0165593 A1* | 7/2010 | Townsend et al. | 361/807 |
| 2011/0102129 A1* | 5/2011 | Dantas | 340/3.1 |
| 2011/0156497 A1* | 6/2011 | Karren | H01M 2/1022 307/139 |
| 2012/0119681 A1* | 5/2012 | Seidl et al. | 315/362 |

FOREIGN PATENT DOCUMENTS

| | | |
|---|---|---|
| CN | 101150985 A | 3/2008 |
| CN | 102829814 B | 12/2016 |
| WO | 2005122879 A1 | 12/2005 |

OTHER PUBLICATIONS

Hall et al., "Turn-onCircuits Based on Standard CMOS Technology for Active RFID Labels," School of Electrical & Electronic Engineering, Univ. of Adelaide, SA, Australia, 11 pages, prior to May 11, 2009.
Europe Patent Application No. 12169673.6, European Search Report, dated Apr. 18, 2017, 4 pages.
Europe Patent Application No. 12169673.6, Examination Report, dated May 4, 2017, 5 pages.
China Patent Application No. 201210195840.9, Office Action, dated Oct. 10, 2015, 20 pages.
China Patent Application No. 201210195840.9, Notification to Grant Patent Right, dated Jul. 29, 2016, 5 pages.

* cited by examiner

METHODS AND SYSTEMS FOR ACTIVATING SEALED SENSORS IN THE FIELD

TECHNICAL FIELD

The disclosure relates generally to sensors, and more particular, to systems and methods for activating sensors in the field.

BACKGROUND

Wireless sensors have demonstrated their value in recent times. Wireless sensors may be used to measure and report a variety of quantities, such as pressure, temperature, position, acoustic output, and other quantities that may be suitably measured. Wireless sensors may be employed in HVAC systems, industrial process monitoring and control, and many other applications.

Wireless sensors may be packaged in sealed enclosures for a number of reasons, including cost reduction and protection of the sensor from the environment. Enclosing sensors in sealed packages can raise operational issues in the field. The present disclosure, among various aspects, provides for initiation of sensors that are packaged in sealed enclosures.

SUMMARY

The disclosure relates generally to sensors, and more particular, to systems and methods for initiating sealed sensors in the field. In an illustrative but non-limiting example, a method for initiating a packaged sensor unit is provided. The packaged sensor unit may include a sensor module, an activation mechanism, and an internal battery, all situated in a sealed enclosure. The method may include applying a pre-defined triggering stimulus to the packaged sensor unit, and detecting the pre-defined triggering stimulus via the activation mechanism of the packaged sensor unit. When the activation mechanism detects the pre-defined triggering stimulus, the internal battery may be connected to the sensor module. Prior to detecting the pre-defined triggering stimulus, both the sensor module and the activation mechanism may draw no power from the internal battery of the packaged sensor unit. This may increase the shelf-life of the packaged sensor unit before the packaged sensor unit is deployed in the field.

In another illustrative but non-limiting example, a packaged sensor unit is provided. The packaged sensor unit may include a sensor module having sensor, a controller operatively coupled to the sensor, and a communication device operatively coupled to the controller. The packaged sensor unit may also include a power supply, an activation mechanism capable of selectively coupling the power supply to the sensor module, and a sealed enclosure housing the sensor module, the power supply, and the activation mechanism. In some cases, the sealed enclosure may be devoid of any external switch. In some instances, the packaged sensor unit may be configured such that the sensor module and the activation mechanism remain in an electronically inactive state until an activation sequence is externally initiated. In an electronically inactive state, the sensor module and activation may, for example, draw no power from the power supply of the packaged sensor unit. In some instances, an energy harvesting device may be included in the packaged sensor unit, which may harvest energy provided to the packaged sensor unit. The activation mechanism may use the harvested energy.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following detailed description of various illustrative embodiments in connection with the accompanying drawings, in which.

DESCRIPTION

Figure 1:
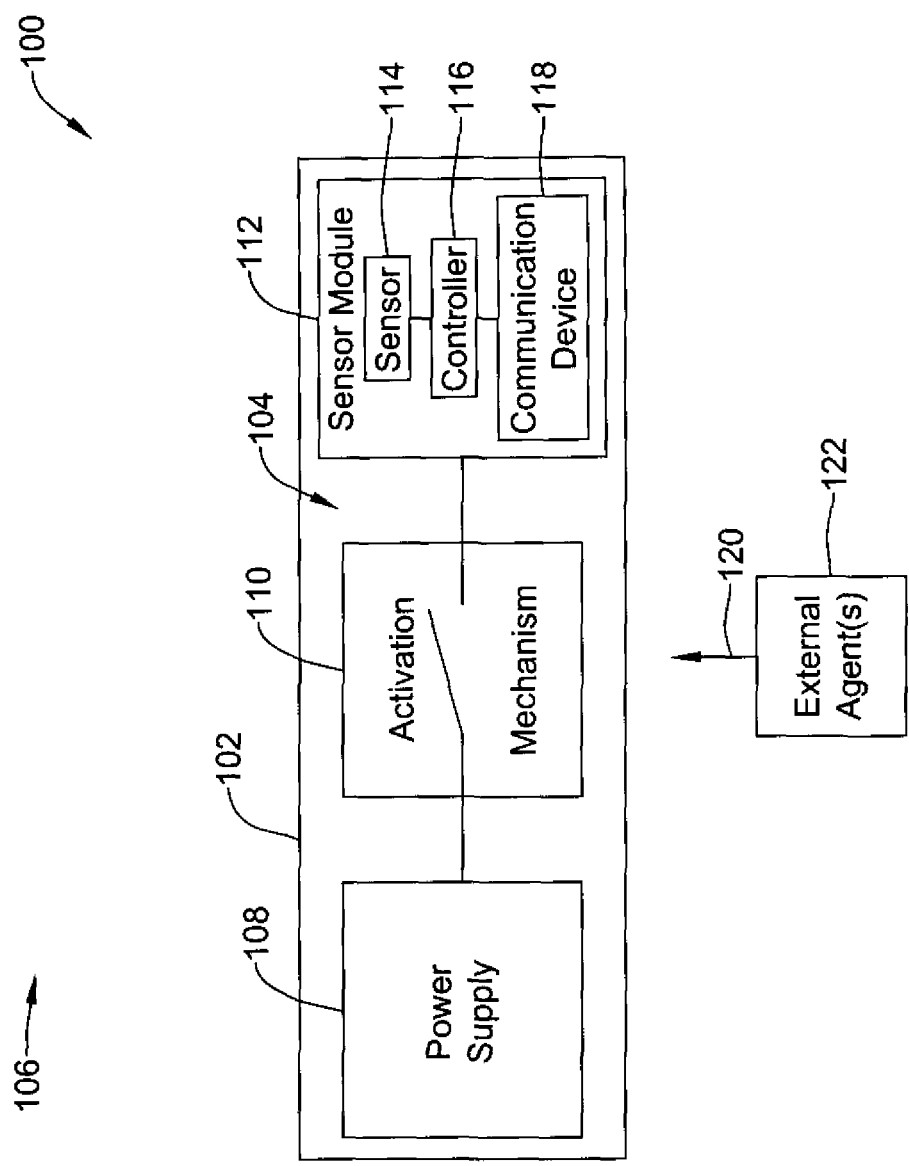
FIG. 1 is a schematic diagram of an illustrative packaged sensor unit.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Wireless sensors typically operate on power provided by an internal or onboard power source, such as a battery. While it is possible that a wireless sensor may be shipped from a factory in a powered-on state, often such sensors are shipped powered-down. By shipping powered-down, battery drain may be avoided prior to deployment of the wireless sensor, and in some cases, it may be desirable or required (due to regulations, for example) that a wireless sensor not emit radio-frequency or other signals during transit. Some wireless sensors that ship unpowered may be powered-up in a number of ways, such as upon insertion of a battery, closing of an externally accessible switch, or some other application of power.

In some illustrative embodiments of the present disclosure, a sensor unit may be packaged in a sealed enclosure or package. A sealed enclosure may be an enclosure that prevents contact between the internal volume inside the enclosure with the external environment outside the enclosure. In some cases, a sealed enclosure, once sealed at the factory, may not be opened or unsealed without irreversibly damaging the ability of the enclosure to seal. In other words, an irreversibly sealed enclosure or package may be permanently sealed upon completion of manufacture, and may not be unsealed or opened before the end-of-life of the sensor unit. In some other cases, it may be possible to open, then reseal a sealed enclosure. In some cases, it may be impractical or cost-prohibitive to re-seal a previously sealed enclosure, once opened.

A sealed enclosure may be employed for cost reduction, as the cost of screws, threading, etc. may be avoided. Also, a sealed enclosure may be suitable for use in hazardous environments, such as in the presence of explosive gases, where the sealed enclosure may prevent or reduce possibility of contact between the explosive gas and potentially hazardous potentials and/or currents originating from within the enclosure. In addition or alternately, a sealed enclosure may protect the sensor unit itself from moisture, corrosive fluids (including liquid and/or gases), etc., of the environment in which the package is deployed, or through which the package is transported, etc.

Use of a sealed enclosure or package may prevent using some methods of powering-up a wireless sensor. For example, it may not be possible to insert a battery to power-up a sensor unit in the field. Many mechanically-actuated switches, which might otherwise be made accessible from the exterior of a sealed enclosure and employed to turn on power for the sensor unit in the field, may not be usable with a sealed enclosure due to the difficulty or impossibility of sealing the enclosure with such a switch present.

FIG. 1 is a schematic diagram of an illustrative packaged sensor unit 100. Illustrative packaged sensor unit is generally shown at 100, and may include a sealed enclosure 102. Substantially all components of the packaged sensor unit 100 may be housed in the interior 104 of the sealed enclosure 102, save for the sealed enclosure itself. Sealed enclosure 102 may substantially or effectively seal its interior 104 from the exterior environment 106. Sealing may include preventing the contact and/or exchange of fluids (liquids or gases) between the interior 104 of the sealed enclosure 102 and the exterior environment 106. In some illustrative embodiments, sealed enclosure 102 may electrically insulate interior 104 from exterior environment 106. In some illustrative embodiments, packaged sensor unit 100 does not provide any conductive pathways between interior 104 and exterior environment 106. In some illustrative embodiments, sealed enclosure 102 may be devoid of any external switches or any other components that could compromise the sealing integrity of the enclosure, such as by providing a pathway for contaminants to enter the interior 102. In some illustrative embodiments, sealed enclosure 102 may provide shielding for electric and/or magnetic fields. In some illustrative embodiments, sealed enclosure 102 may help thermally insulate between interior 104 and exterior environment 106. In some illustrative embodiments, sealed enclosure 102 may substantially thermally conduct between interior 104 and exterior environment 106. It is contemplated that the sealed enclosure 102 may define exterior walls that provide an interface between the interior 104 and the exterior environment 106.

Sealed enclosure 102 may be constructed of any suitable material, in any suitable manner. For example, in some illustrative embodiments, multiple enclosure elements may be bonded together during manufacture, with the bonding providing a final seal. In some illustrative embodiments, multiple enclosure elements may be snap fit together, possibly with a gasket or like sealing member disposed between enclosure elements to provide sealing. In some illustrative embodiments, a sealed enclosure 102 may be substantially rigid. In other illustrative embodiments, a sealed enclosure 102 may be mechanically flexible, allowing a degree of deformation with applied mechanical force.

As shown in FIG. 1, packaged sensor unit 100 may include a power supply 108, such as an internal battery or other suitable energy storage device (e.g. a super capacitor, a fuel cell, etc.), an activation mechanism 110, and a sensor module 112. The sensor module 112 may include a sensor 114, a controller 116 operatively coupled to the sensor 114, and a communication device 118 operatively coupled to the controller 116. In some illustrative embodiments, all components of power supply 108, activation mechanism 110, and sensor module 112 are disposed entirely within the interior 104 of sealed enclosure 102. In some illustrative embodiments, a component such as sensor 114 of sensor module 112 may be disposed in, on, or through, or be integrated with, sealed enclosure 102 such that the sensor 114 may physically contact and/or sensingly communicate with the exterior environment 106. Generally, provisions for such external contact or communication may be achieved in such a way that does not compromise the seal between the interior 104 of the sealed enclosure 102 and the exterior environment 106.

Sensor 114 may be any suitable sensor configured to measure any quantity of interest, such as temperature, pressure, humidity, flow rate, magnitude of an electric, magnetic, or electromagnetic field, position and/or movement (e.g. global positioning sensor, accelerometer or gyroscope), and the like. Communication device 118 may be configured to employ any suitable communication technologies and protocols, such as (but not limited to) infrared (IR), near-field communications (NFC), surface acoustic waves (SAW), radio-frequency identification (RFID), Bluetooth, WiFi, other RF standards, etc. Communication device 118 may be used to communicate sensor measurements to a measurement and/or control system.

As schematically represented in FIG. 1 with the use of the symbol for a switch, activation mechanism 110 may be capable of selectively coupling or connecting the internal power supply 108 to the sensor module 112. The selective coupling may be initiated from external of the sealed enclosure 102 as part of an activation sequence, as discussed in further detail herein. Prior to the activation sequence, which may include detection of a pre-defined triggering stimulus 120 applied by one or more external agents 122, both the sensor module 112 and the activation mechanism 110 may remain in an electronically inactive state. In such a state, the sensor module 112 and the activation mechanism 110 may draw no power from the power supply (battery) 108 of the packaged sensor unit. In some illustrative embodiments, a component in an electronically inactive state may neither dissipate electrical power nor radiate electromagnetic radiation.

Figure 2:
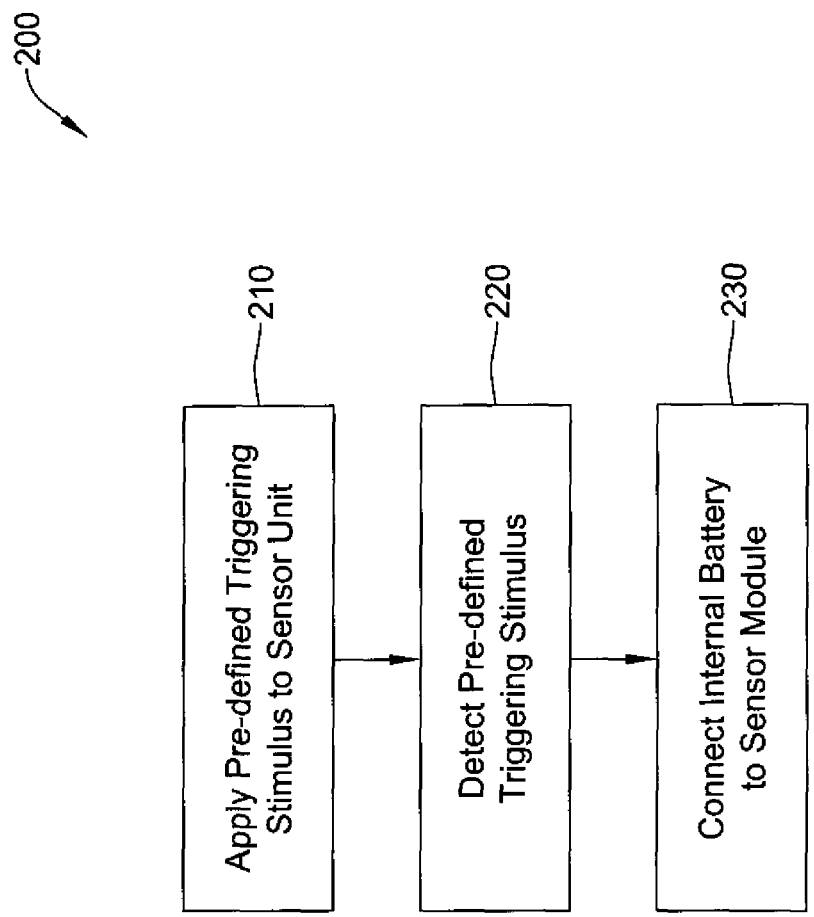
FIG. 2 is a flowchart of an illustrative method for initiating a packaged sensor unit.

FIG. 2 is a flowchart of an illustrative method 200 for initiating a packaged sensor unit such as that of FIG. 1 or any other suitable packaged sensor unit. At step 210, a pre-defined triggering stimulus 120 may be applied to the packaged sensor unit 100. The pre-defined triggering stimulus 120 may be applied by at least one external agent 122 (located external to the sealed enclosure 102). At step 220, the pre-defined triggering stimulus 120 may be detected via the activation mechanism 110 of the packaged sensor unit. In response to the activation mechanism 110 detecting the pre-defined triggering stimulus 120, the activation mechanism may connect or couple the power supply 108 to the sensor module 112 such that the sensor module may draw power from the power supply and enter an electronically active state. Prior to detecting the pre-defined triggering stimulus 120, the packaged sensor unit 100 may be configured such that sensor module 112 draws no power from power supply 108. Alternatively, or in addition, the packaged sensor unit 100 may be configured such that activation mechanism 110 draws no power from power supply 108 prior to detecting the pre-defined triggering stimulus 120.

As the activation mechanism 110 may generally include or be the component that detects the pre-defined triggering stimulus 120, the structure of the activation mechanism may be linked to the pre-defined triggering stimulus. For example, the activation mechanism 110 may include a switch, and the pre-defined triggering stimulus may include exerting a force that mechanically closes the switch, resulting in connecting the power supply 108 to the sensor module 112. In some illustrative embodiments, the switch may be a magnetic switch, and the force may be a magnetic force. The step of applying the pre-defined triggering stimulus may include providing a magnetic field through the wall of the sealed enclosure 102. In some such cases, a coded magnetic key may be employed to provide a coded magnetic field that is keyed to a coded magnetic switch. That is, the activation mechanism may include a magnetic switch matched to the coded magnetic key, but this is not required. Other magnetically-actuated activation mechanisms are contemplated.

In some illustrative embodiments, the pre-defined triggering stimulus may include acceleration of the packaged sensor unit 100 in a pre-defined acceleration profile. In such an embodiment, the activation mechanism 110 may include a mechanical switch that closes when the packaged sensor unit 100 is subjected to the pre-defined acceleration profile. Such an acceleration profile may be produced, for example, by shaking, striking, jerking, or otherwise applying a pre-defined mechanical impulse to the packaged sensor unit.

In some illustrative embodiments, the activation mechanism 110, once activated, may irreversibly couple the power supply 108 to the sensor module 112. In some other illustrative embodiments, the internal battery 108 may be selectively disconnected from the sensor module 112 after it has been connected to the sensor module. Such selective disconnection may be facilitated by the activation mechanism 110, or by another mechanism (not illustrated) of the packaged sensor unit. For example, a mechanical switch may be opened via application of an appropriate magnetic field, or by subjecting the packaged sensor unit to a suitable acceleration profile. The switch that opens may the same switch that closed previously to connect the internal battery 108 to the sensor module 112, or it may be a different switch or the like.

In some illustrative embodiments, at least some of the walls of the sealed enclosure 102 may be mechanically flexible, and the pre-defined triggering stimulus may include applying compression or tension to the sealed enclosure. The activation mechanism 110 may include a mechanical switch coupled to the walls of the sealed enclosure 102, or response to increased pressure inside the sealed enclosure 102, to detect the applied compression or tension. In some illustrative embodiments, the pre-defined triggering stimulus does not include applying compression or tension to the sealed enclosure. In some illustrative embodiments, the pre-defined triggering stimulus does not include the application of static force to the sealed sensor unit.

Figure 3:
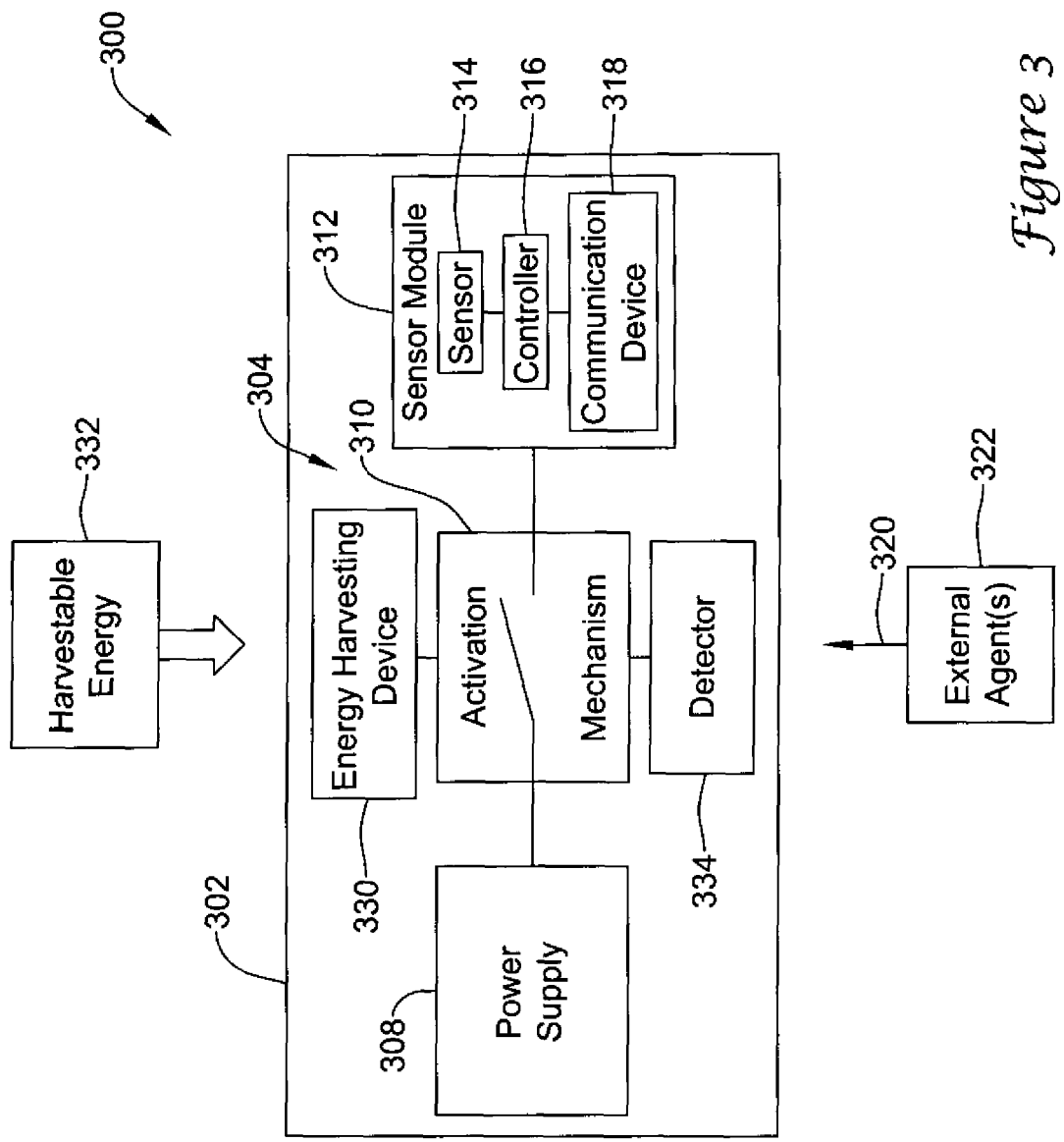
FIG. 3 is a schematic diagram of an illustrative packaged sensor unit having an energy harvesting device.

FIG. 3 is a schematic diagram of an illustrative packaged sensor unit 300 having an energy harvesting device 330. Some features of the illustrative packaged sensor unit 300 may be similar or identical to corresponding features of packaged sensor unit 100. Energy harvesting device 330, when supplied with harvestable energy 332, may harvest the harvestable energy 332 as part of an externally-initiated activation sequence. Harvested energy may be provided to the activation mechanism 310. Energy harvesting device 330 may include or be connected to an energy storage device, such as a battery, super-capacitor, etc., in the interior 304 of sealed enclosure 302.

Energy provided by the energy harvesting device 330 may allow powered operation of the activation mechanism 310. For example, in some illustrative embodiments, a powered detector 334 may be used to detect a pre-defined triggering stimulus to result in the activation mechanism connecting power supply/internal battery 308 to sensor module 312, initiating the packaged sensor unit 300. In some cases, powered detector 334 may be a dedicated device of the activation mechanism 310. It is contemplated in some other illustrative embodiments, however, that another device not solely purposed for detection of pre-defined triggering stimulus may be used, such as sensor 314 of the sensor module 312, or, one or more components of communication device 318. More generally, it is contemplated that any suitable device may be used as a powered detector 334. Detector 334 may be used to detect a pre-defined triggering stimulus, such as an electric and/or magnetic field, provided through the wall of the sealed enclosure 302. In some embodiments, the pre-defined triggering stimulus may be a radio-frequency transmission employing a standard RF communication protocol. In some embodiments, detector 334 may be an accelerometer suitable for detecting a pre-defined acceleration profile. In some illustrative embodiments, a pre-defined triggering stimulus may come in the form of a type of measure and that the packaged sensor unit is tasked to measure and report.

While in some embodiments, the activation mechanism 110, 310 draws no power from power supply 108, 308 prior to initiation of an activation sequence, in some illustrative embodiments, the activation mechanism may draw some power from the power supply prior to initiation of an activation sequence. Such power may be used, for example, to power a detector 334 or other sensor to detect a pre-defined triggering stimulus, or for any other suitable purpose. A packaged sensor unit with an activation mechanism that draws power from an internal power supply may have a shorter powered mission life than a packaged sensor unit with an activation mechanism that does not draw power from an internal power supply.

Aside from powered detection of pre-defined triggering stimuli, energy provided by the energy harvesting device 330 may be used by the activation mechanism 310 to close an electronic switch or the like to connect the power supply/battery 308 to the sensor module 312. In a more general sense, the harvested energy may be considered to have been used to connect the internal battery to the sensor module if any part of the process of making such a connection (such as detecting the pre-defined triggering stimulus) is performed using the harvested energy.

Energy harvesting device 330 may be any suitable device capable of harvesting any suitable harvestable energy 332. The energy harvesting device 330 may harvest one or more of thermal energy, mechanical energy, optical energy, electromagnetic energy, or other energy. The step of providing harvestable energy may include, for example, exposing the packaged sensor unit 300 to a temperature difference or differential; translating, rotating, or otherwise subjecting the packaged sensor unit 300 to motion; exposing the packaged sensor unit 300 to light (the packaged sensor unit may be shielded from light until activation); subjecting the packaged sensor unit 300 to a time-varying electromagnetic field; and so on. The energy harvesting device 330 may convert the harvested energy into electrical energy, but conversion to other forms of energy, which may be stored, is also contemplated in some embodiments.

In some illustrative embodiments, the act of providing harvestable energy itself may be the act of providing the pre-defined triggering stimulus to the sensor unit. Harvesting a sufficient amount of energy may trigger the activation mechanism 310, which may then connect the internal power supply to the sensor module. In some cases, the activation mechanism 310, once activated, may irreversibly couple the power supply 308 to the sensor module 312.

In some illustrative embodiments, a packaged sensor unit 300 includes an energy harvesting device 304, and the activation mechanism 310 requires power from the energy harvesting device 330 to couple the internal power supply 308 to the sensor module 312 to activate the sensor module 312. In some illustrative embodiments, a sensor module 312 of a packaged sensor unit 300 may use energy harvested by an energy harvesting device 330, but this is not required.

Initiation or activation of a packaged sensor unit, which may include initiation or activation of a sensor module of the packaged sensor unit, may include the step of commissioning the sensor unit and/or sensor module. Commissioning may include any steps that facilitate the use of the packaged sensor unit in the field. In some cases, commissioning may be necessary for the packaged sensor unit to be used by a measurement and/or control system. In other cases, commissioning may not be required at all. Commissioning may include, for example, establishing communication protocols between the packaged sensor unit and external devices, which may include secure communications; calibration of one or more sensors of the packaged sensor unit; download or other specification of configuration parameters to the packaged sensor unit, and the like. Bulk commissioning of more than one packaged sensor unit during a commissioning session may be performed. In some illustrative embodiments, multiple packaged sensor units may share one or more security keys. In some illustrative embodiments, packaged sensor units may have unique security keys. Commissioning may be accomplished by any suitable protocol. Any suitable communications means may be employed for commissioning, including but not limited to IR, NFC, SAW, RFID, Bluetooth, WiFi, other RF standards, etc. The communication device (e.g., 118/318) of a sensor module may be used for commissioning, or other hardware of the packaged sensor unit may be employed. In some illustrative embodiments, commissioning may be performed subsequent to the step of connecting the internal battery to the sensor module. In some illustrative embodiments, commissioning may be performed prior to the step of connecting the internal battery to the sensor module. Such prior commissioning may be performed, for example, at a factory with the sensor module powered-up, then the sensor module may be powered-down for transport, storage, etc. until subsequent powering-up in the field via one or more methods of the present disclosure.

Figure 4:
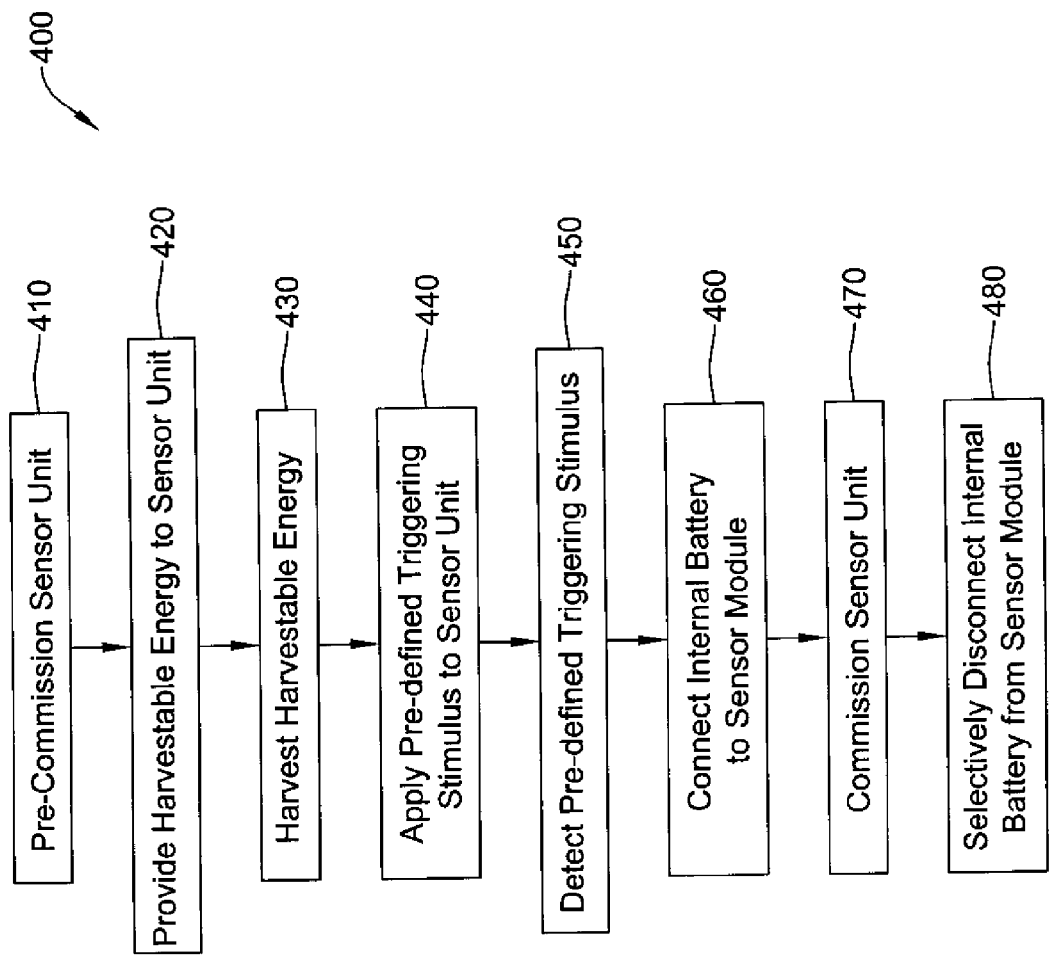
FIG. 4 is a flowchart of another illustrative method for initiating a packaged sensor unit.

FIG. 4 is a flowchart of another illustrative method 400 for initiating a packaged sensor unit, such as packaged sensor unit 300 of FIG. 3. At 410, the packaged sensor unit optionally may be pre-commissioned, for example, at a factory. At 420, harvestable energy may be provided to the packaged sensor unit. At 430, the energy harvesting device of the packaged sensor unit (if so equipped) may harvest the harvestable energy. At 440, a pre-defined triggering stimulus may be applied to the packaged sensor unit. At 450, the pre-defined triggering stimulus may be detected by the activation mechanism of the packaged sensor unit; if an energy harvesting device is present, the activation mechanism may use harvested energy. At 460, following detection of the pre-defined triggering stimulus, the internal battery (power supply) of the packaged sensor unit maybe connected to the sensor module. At 470, the packaged sensor unit may be commissioned, if needed or desired. At 480, the internal battery may optionally be selectively disconnected from the sensor module. In some cases, the internal battery (power supply) may be irreversibly coupled to the sensor module.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A packaged sensor unit, comprising:
   a sensor module including:
      a sensor;
      a controller operatively coupled to the sensor; and
      a communication device operatively coupled to the controller;
   a power supply;
   a mechanical switch capable of selectively coupling the power supply to the sensor module, wherein the mechanical switch is configured to mechanically move between an open state and a closed state in response to acceleration of the packaged sensor unit;
   a sealed enclosure housing the sensor module, the power supply, and the mechanical switch, the sealed enclosure being devoid of any external switch;
   wherein:
   the packaged sensor unit is configured such that the sensor module and the mechanical switch remain in an electronically inactive state until an activation sequence comprising acceleration of the packaged sensor unit is externally initiated and then enters an electronically active state after the activation sequence,
   the mechanical switch includes an energy harvesting device, and
   wherein the mechanical switch is configured to require power from the energy harvesting device to couple the power supply to, and activate, the sensor module.

2. The packaged sensor unit of claim 1, wherein the mechanical switch, once activated, irreversibly couples the power supply to the sensor module.

3. A packaged sensor unit comprising:
   a sealed enclosure;
   a sensor unit situated in the sealed enclosure, the sensor unit including:
      a sensor module;
      an activation mechanism, comprising a mechanical switch that is configured to mechanically move between an open state and a closed state in response to compression or tension applied to the sealed enclosure; and
      an internal battery;
   wherein the activation mechanism of the sensor unit is configured to detect a pre-defined triggering stimulus comprising the compression or tension that is applied from outside of the sealed enclosure, and once the pre-defined triggering stimulus is detected, the activation mechanism is configured to move the mechanical switch from an open state to a closed state to connect the internal battery of the sensor unit to the sensor module, wherein the internal battery remains connected to the sensor module after the trigger stimulus is removed, wherein the mechanical switch includes an energy harvesting device, and wherein the mechanical switch is configured to use power from the energy harvesting device to couple the power supply to, and activate, the sensor module.

4. The packaged sensor unit of claim 1, wherein the mechanical switch is configured to move from the closed state to the open state in response to exposure to a magnetic field.

5. The packaged sensor unit of claim 1, wherein the mechanical switch is configured to move from the closed state to the open state in response to exposure to a second acceleration of the packaged sensor unit.

6. The packaged sensor unit of claim 1, wherein the sensor module and the mechanical switch remain in the electronically inactive state while the mechanical switch is in the open state, and wherein the sensor module and the mechanical switch are configured to be in the electronically active state while the mechanical switch is in the closed state.

7. The packaged sensor unit of claim 1, wherein in the electronically inactive state, the mechanical switch and sensor module draw no power from the power supply.

8. The packaged sensor unit of claim 1, wherein the sealed enclosure comprises a fluid tight seal.

9. The packaged sensor unit of claim 1, wherein the sealed enclosure is permanently sealed.

10. The packaged sensor unit of claim 3, wherein the sealed enclosure is configured to generate an internal pressure change in response to the compression or tension applied to the sealed enclosure, and wherein the activation mechanism is configured to move the mechanical switch from an open state to a closed state in response to the internal pressure change.

11. The packaged sensor unit of claim 3, wherein the sealed enclosure comprises a fluid tight seal.

12. A method for initiating a packaged sensor unit, the method comprising:
exerting a force on a sensor unit, wherein the sensor unit comprises a sensor module, an activation mechanism including a mechanical switch, and an internal battery, wherein the sensor module, the activation mechanism, and the internal battery are all contained in a sealed enclosure, and wherein the activation mechanism includes an energy harvesting device;
mechanically closing the mechanical switch in response to the force;
providing harvestable energy to the sensor unit through a wall of the sealed enclosure;
harvesting, with the energy harvesting device, the harvestable energy; and
connecting the internal battery to the sensor module using the harvestable energy in response to closing the mechanical switch, wherein prior to detecting the pre-defined triggering stimulus, both the sensor module and the activation mechanism draw no power from the internal battery of the packaged sensor unit.

13. The method of claim 12, wherein the step of applying the pre-defined triggering stimulus includes providing a magnetic field through a wall of the sealed enclosure.

14. The method of claim 13, wherein the step of applying the pre-defined triggering stimulus includes providing a magnetic field through the wall of the sealed enclosure, and a coded magnetic key is employed to provide the magnetic field.

15. The method of claim 12, wherein the step of applying the pre-defined triggering stimulus includes accelerating the packaged sensor unit in a pre-defined acceleration profile, and the activation mechanism includes an accelerometer.

16. The method of claim 12, further comprising the step of commissioning the packaged sensor unit subsequent to the step of connecting the internal battery to the sensor module.

17. The method of claim 12, further comprising the step of selectively disconnecting the internal battery from the sensor module after the step of connecting the internal battery to the sensor module.

18. The method of claim 12, wherein the connecting step is irreversible.

* * * * *